United States Patent [19]

Nix

[11] Patent Number: 4,991,627
[45] Date of Patent: Feb. 12, 1991

[54] CONNECTOR FOR MODULAR PREFILLED HYDRAULIC CONTROL APPARATUS

[75] Inventor: Richard A. Nix, Rochester Hills, Mich.

[73] Assignee: Automotive Products plc, Warwickshire, England

[21] Appl. No.: 481,815

[22] Filed: Feb. 20, 1990

Related U.S. Application Data

[60] Continuation of Ser. No. 310,839, Feb. 14, 1989, abandoned, which is a division of Ser. No. 133,247, Dec. 10, 1987, abandoned; which is a continuation of Ser. No. 899,717, Aug. 25, 1986, abandoned.

[51] Int. Cl.⁵ .............................................. F15L 29/00
[52] U.S. Cl. ................................. 137/614.03; 285/319
[58] Field of Search ............... 285/308, 315, 319, 320; 137/614.3; 60/584

[56] References Cited

U.S. PATENT DOCUMENTS

| | | |
|---|---|---|
| 281,991 | 1/1858 | Eitner . |
| 1,634,813 | 7/1927 | Whitehead . |
| 1,703,311 | 2/1929 | Litle, Jr. . |
| 1,934,206 | 11/1933 | Page . |
| 2,303,577 | 12/1942 | Ottenheimer . |
| 2,453,741 | 11/1948 | Bopp . |
| 2,465,197 | 3/1949 | Chatham ........................ 285/33 |
| 2,511,765 | 6/1950 | Bradbury . |
| 2,536,628 | 1/1951 | Denisoff . |
| 2,540,649 | 2/1951 | Boylan . |
| 2,934,915 | 5/1960 | Morse . |
| 3,040,886 | 6/1962 | Svenson . |
| 3,447,819 | 6/1969 | Borsum ........................ 285/315 X |
| 3,654,689 | 4/1972 | Schwarz . |
| 3,776,333 | 12/1973 | Mathauser . |
| 4,122,678 | 10/1978 | Wilson . |
| 4,288,113 | 9/1981 | Saulnier ........................ 285/308 X |
| 4,503,678 | 3/1985 | Wimbush . |
| 4,506,507 | 3/1985 | Wimbush . |
| 4,581,979 | 4/1986 | Compton et al. . |
| 4,599,860 | 7/1986 | Parsons . |
| 4,624,291 | 11/1986 | Compton et al. ................. 60/584 X |
| 4,660,803 | 4/1987 | Johnston et al. ............... 285/315 X |
| 4,793,637 | 12/1988 | Laipply et al. ................. 285/319 X |

FOREIGN PATENT DOCUMENTS

| | | |
|---|---|---|
| 2048419 | 3/1971 | France . |
| 1255063 | 10/1989 | France . |
| 1343903 | 4/1971 | United Kingdom . |
| 1346974 | 10/1972 | United Kingdom . |
| 2021226 | 5/1979 | United Kingdom . |
| 1207284 | 10/1989 | United Kingdom . |

*Primary Examiner*—John C. Fox
*Attorney, Agent, or Firm*—Krass & Young

[57] ABSTRACT

A hydraulic control apparatus, having a master cylinder, a slave cylinder and a conduit connecting the master cylinder to the slave cylinder, is made of separate modular units interconnectable by leakproof connectors. The apparatus is prefilled with hydraulic fluid while the separate modular units are interconnected, and after filling the separate modular units are disconnected and shipped to a user, unconnected but filled with hydraulic fluid. Alternatively, the separate modular units may be individually filled with hydraulic fluid, and shipped to a user unconnected but each filled with hydraulic fluid. After installation on a utilization device, for example a motor vehicle, the complementary connector members are reconnected for placing the individual modular units in hydraulic fluid communication. The connectors take the form of complementary members which are arranged to open fluid passageway during connection. A one-way locking or retainer clip is disposed in one connector member for interlocking engagement with appropriate abutments in the other connector member for preventing separation of the members after coupling. The connector members may be disconnected by using an appropriate tool, or by providing a disconnect element built in one of the connector members, to enable disconnecting the members after installation of the apparatus on a motor vehicle for example, for the purpose of repair or replacement of components.

15 Claims, 3 Drawing Sheets

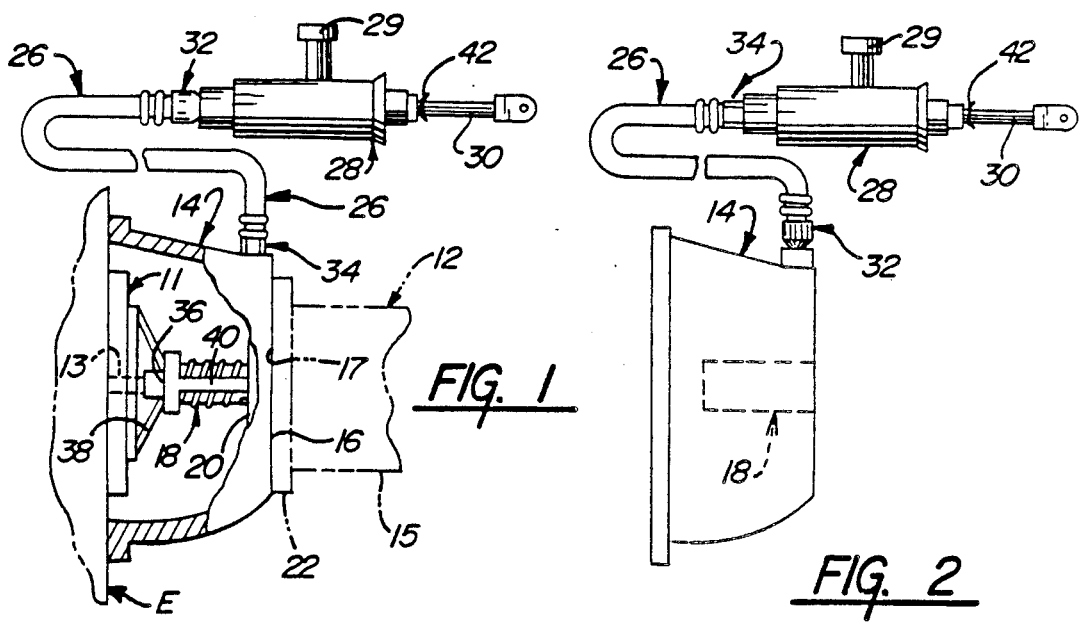
FIG. 1
FIG. 2
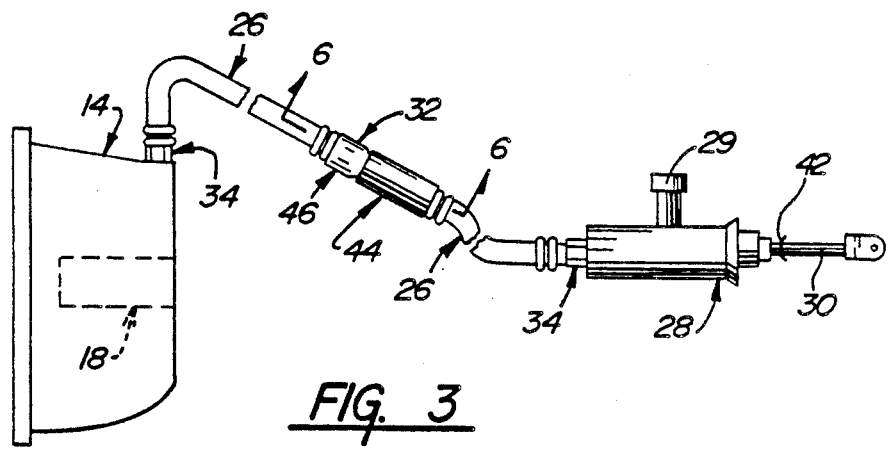
FIG. 3
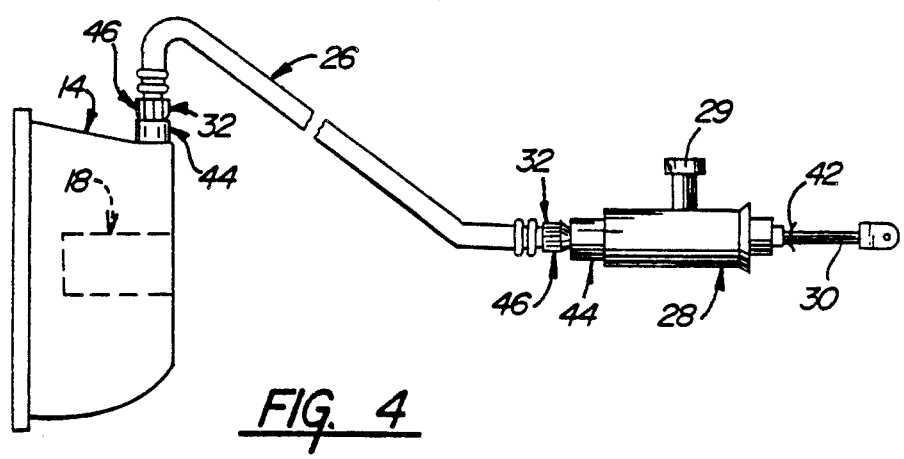
FIG. 4

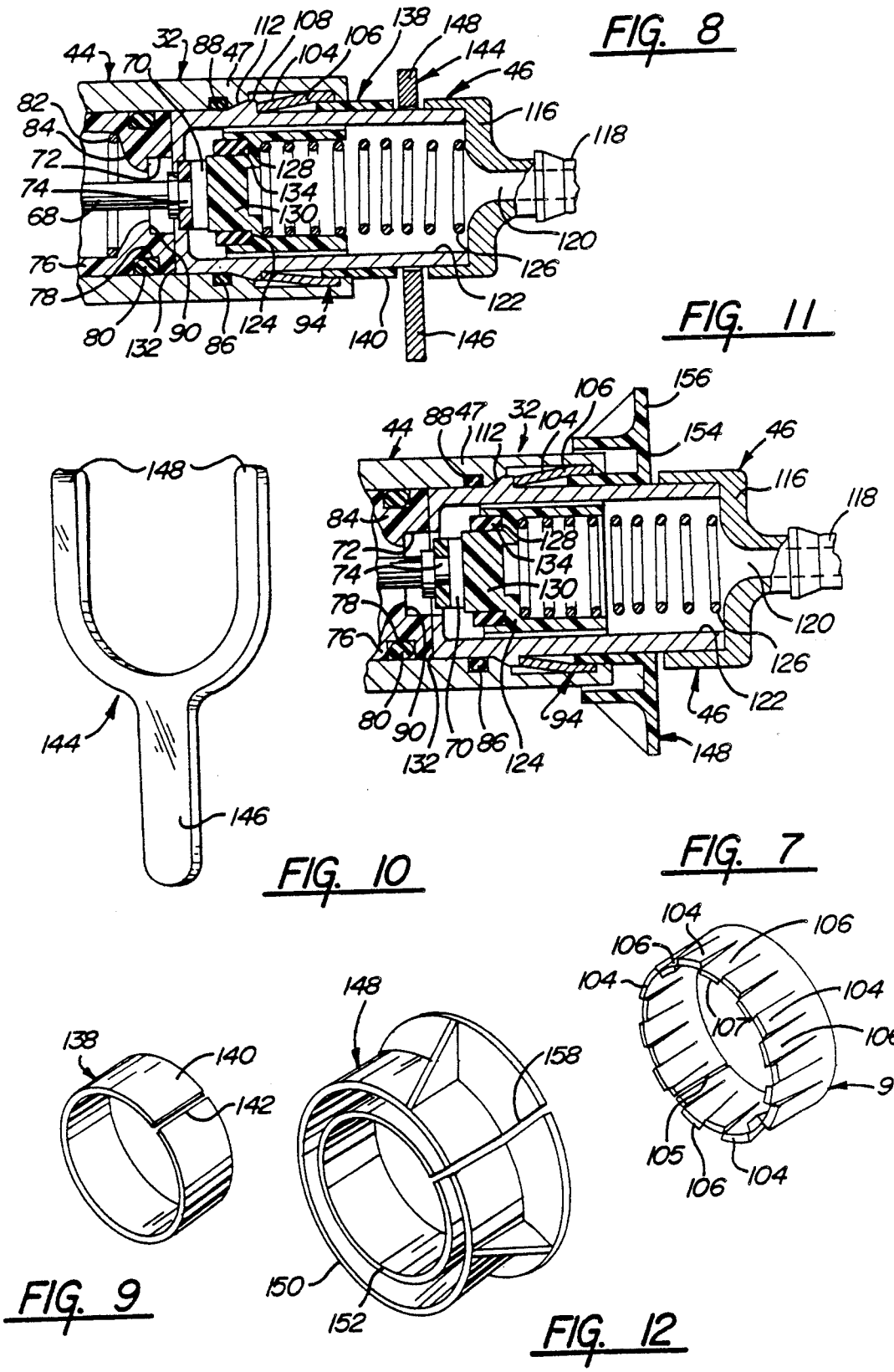

CONNECTOR FOR MODULAR PREFILLED HYDRAULIC CONTROL APPARATUS

CROSS-REFERENCE TO RELATED APPLICATIONS

This is a continuation of co-pending application Ser. No. 310,839 filed on Feb. 14, 1989 now abandoned, which is a division of application Ser. No. 133,247, filed Dec. 10, 1987 now abandoned, which is a continuation of 899,717, filed Aug. 25, 1986 now abandoned.

CROSS-REFERENCE TO RELATED APPLICATIONS

The present application is related to application Ser. Nos. 555,667, 607,020, 608,329, 797,404, 797,405 and 797,406, all assigned to the same assignee as the present application.

BACKGROUND OF THE INVENTION

The present invention has applications to hydraulic apparatus in general, and more particularly to a hydraulic control apparatus comprising a hydraulic master cylinder and a hydraulic slave cylinder for operating a mechanism remotely located from the master cylinder: the hydraulic control apparatus being prefilled with hydraulic fluid and pretested prior to shipment to a motor vehicle manufacturer, for example for installation in a motor vehicle.

It is now known to prefill with hydraulic fluid a motor vehicle clutch control apparatus, comprising a master cylinder, a reservoir of hydraulic fluid, and a slave cylinder for operating the throwout bearing of a mechanical diaphragm spring clutch, as disclosed in British Patent No. 1,539,879 and in corresponding U.S. Pat. Nos. 4,407,125, and 4,599,860 assigned to the same assignee as the present application. In addition, U.S. Pat. Nos. 4,503,678, 4,506,507, 4,585,106, 4,585,107, 4,585,108 and 4,585,109, all assigned to the same assignee as the present application, also disclose diverse forms of prefilled hydraulic control apparatus for motor vehicle clutches, and co-pending applications Ser. Nos. 555,666 and 555,668 discloses prefilled hydraulic control apparatus for transmission shifting mechanisms and throttle mechanisms, respectively.

Prefilling with hydraulic fluid and pretesting hydraulic apparatus for operating motor vehicle mechanisms such as mechanical clutches present the many advantages, for the motor vehicle manufacturer, of receiving a fully assembled mechanism comprising all the components filled with hydraulic fluid and pretested for proper operation, ready to install on a motor vehicle on the assembly line, without requiring that the components be installed separately, connected by way of a rigid or flexible conduit, and filled after installation with hydraulic fluid while being purged of any atmospheric air contained in the apparatus.

In apparatus wherein the slave cylinder, actuating the clutch release mechanism, takes the form of a conventional cylindrical cylinder-piston assembly with the piston rod projecting from the cylinder housing attached at its end to the clutch release lever, the slave cylinder being attached at some portion of the clutch bell housing, permanent connection of the master cylinder to the slave cylinder by means of a flexible conduit, and prefill of the apparatus with hydraulic fluid do not present much inconvenience, whether the slave cylinder or the master cylinder is installed first on the vehicle, and the other cylinder is installed at some other subsequent station on the assembly line. The last installed component may be simply left dangling on the end of the flexible conduit, or it may be attached by means of straps, wires or strings to some portion of the motor vehicle frame or body, until definitely mounted in it operative position. However, with the present trend toward utilizing annular slave cylinders disposed concentric to the driveshaft and bolted either to the face of the transmission or gearbox casing or, in the alternative, mounted on or mad integral with the clutch bell housing, such that the annular piston within the concentric annular slave cylinder may operate the clutch throwout bearing. It is difficult to provide a fully assembled, fully tested, prefilled apparatus, without some accompanying inconveniences. Such inconveniences relate to the requirement that the annular slave cylinder be installed first in the clutch bell housing or on the transmission casing face, and the master cylinder on the end of the flexible line or conduit interconnecting the master and slave cylinders be provisionally attached, in some manner by strings, wires or straps to the motor vehicle frame, and subsequently installed in its proper position through the passenger compartment floorboard or bulkhead.

The inventions disclosed in application Ser. No 555,667, 607,020 and 680,329, all assigned to the same assignee as the present application remedy the inconveniences enumerate hereinbefore with respect to preassembled prefilled hydraulic control apparatus for motor vehicle mechanical clutches, more particularly in structures wherein the throwout bearing is operated by a concentric annular slave cylinder, while presenting all the advantages of prefilled and pretested clutch control apparatus. Such results are achieved by a pretested prefilled hydraulic clutch control mechanism provided with a one-way quick-connect fitting or connector either at some point of the flexible conduit connecting the master cylinder to the slave cylinder, or at the end of the conduit connected to the master cylinder, or at the end of the conduit connected to the slave cylinder. The one-way quick-connect fitting or connector is arranged such that after the hydraulic control mechanism has been assembled, prefilled with hydraulic fluid and pretested, the connection between the master cylinder and the slave cylinder may be broken, without loss of fluid, or negligible loss of fluid. The apparatus may thus be shipped to the motor vehicle manufacturer, completely filled with hydraulic fluid but in two separate portions such that the concentric slave cylinder may be made a part of the clutch bell housing, or of the transmission casing. This allows the slave cylinder clutch bell housing assembly, or the slave cylinder transmission casing assembly to be installed in the motor vehicle at whatever station on the assembly line that the clutch or transmission is installed, and the master cylinder may be installed in the motor vehicle also at whatever appropriate station, and the two cylinders connected together without any loss, or negligible loss, of fluid and without introduction of air into the apparatus.

SUMMARY OF THE INVENTION

The present invention has for its principal object to provide a one-way quick connect fitting or connector for a prefilled hydraulic control mechanism. The one-way quick connect fitting or connector may be disposed at either end of a flexible line or conduit connecting a master cylinder to a slave cylinder, or may be disposed at some intermediary point between the ends of the flexible conduit. The one-way quick connect fitting or connector is made of two half-connectors, a female member and a male member which, once coupled, cannot be uncoupled, except by means of a special tool or by means of an uncoupling sleeve forming part of the connector assembly.

The present invention permits to assemble a hydraulic control apparatus, prefill it with hydraulic fluid and pretest it. After this has been accomplished, the connection between the master cylinder and the slave cylinder may be broken, without loss of fluid, or negligible loss of fluid, and the apparatus may be shipped to a motor vehicle manufacturer. completely filled with hydraulic fluid but in two or three separate portions, such that the slave cylinder may be made a part of the clutch bell housing, or of the transmission casing, for example, and thus installed in the motor vehicle at whatever convenient station on the assembly line that the clutch or transmission is installed, and such that the master cylinder may be installed in the motor vehicle at any appropriate station of the assembly line, and the two cylinders connected together without any loss of fluid and without the introduction of air into the apparatus. In addition, the present invention permits to prefill the hydraulic control apparatus in its separate portions, and to connect the portions on the assembly line without loss of fluid and without introduction of air into the apparatus, thus doing away with the requirement of filling the apparatus with hydraulic fluid and appropriately bleeding the apparatus after installation on a motor vehicle on the assembly line. Furthermore, the present invention permits to effectuate any repair on the motor vehicle requiring disconnecting the master cylinder from the slave cylinder, such as for example effecting repairs on the engine, on the clutch or on the transmission, which may require removal of a component from the motor vehicle and disconnecting the slave cylinder from the master cylinder especially in installations wherein the slave cylinder is an annular cylinder mounted around the motor vehicle driveshaft. As a further advantage, the present invention permits to replace one of the components of the hydraulic control apparatus without the requirement of replacing the other components and without the requirement of refilling and bleeding the whole system after replacement of a component. The present invention has many applications to other automotive mechanisms, such as hydraulic brake systems, hydraulic gear shifters and hydraulic throttle controls, for example.

Other objects and advantages of the present invention will become apparent to those skilled in the art when the following description of the best nodes contemplated for practicing the invention is read in conjunction with the accompanying drawing wherein like reference numerals refer to like or equivalent parts, and in which:

BRIEF DESCRIPTION OF THE DRAWINGS

FIG. 1 is a schematic representation of a clutch hydraulic control apparatus according to the present invention;

FIGS. 2 through 4 are views generally similar to FIG. but showing modifications thereof;

FIG. 7 is a perspective view of an example of structure for a retainer clip for holding together the separate halves of a leakproof quick-connect connector according to the invention;

FIG. 8 is a partial view similar to FIG. 7, but showing a modification thereof;

FIG. 9 is a perspective view of a disconnect ring forming part of the assembly of FIG. 8;

FIG. 10 is an example of a hand tool for disconnecting the male and female members of the quick-connect connector of FIG. 8;

FIG. 11 is a view similar to FIGS. 7 and 8, but showing a further modification of the invention; and FIG. 12 is a perspective view of a disconnect ring or sleeve forming part of the assembly of FIG. 11.

DETAILED DESCRIPTION OF THE PREFERRED EMBODIMENTS

Figure 5:
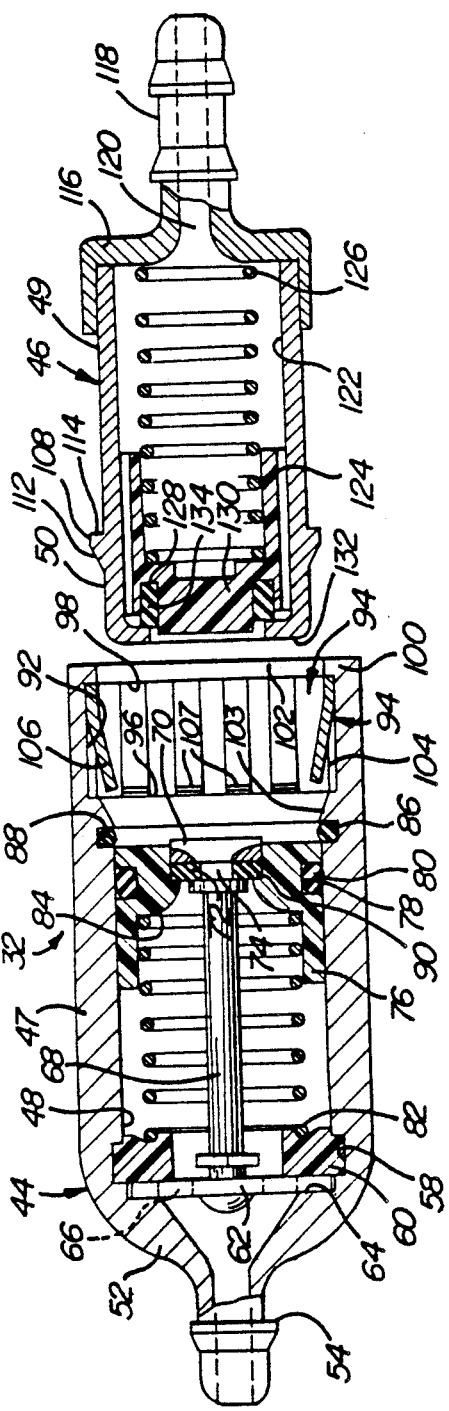
FIG. 5 is a longitudinal section showing the two separate halves of a leakproof quick-connect fitting or connector according to the present invention, prior to coupling.

Referring to the drawing, and more particularly to FIG. 1, a motor vehicle transmission is schematically illustrated as comprising a friction clutch assembly and a gearbox 12 enclosed in a casing or housing 15. A driveshaft 13 drives the gearbox 12 from the clutch assembly. 11. A bell housing 14, surrounding the clutch assembly 11, is bolted on the rear face of the motor vehicle engine E. The rear face 16 of the bell housing 14 is bolted to the face 17 of the gearbox casing 15. An annular hydraulic slave cylinder 18 is disposed around the driveshaft within the bell housing 14. In the example of structure illustrated, the slave cylinder 18 has a one-piece housing 20 cast integral with the clutch bell housing 14. The face 17 of the gearbox casing 20 is on a flange 22, and an end plate, not shown, closing the end of the gearbox casing 15 is also bolted to the face 17 of the gearbox casing 15, the transmission input shaft as shown in dashed lines, projecting through the end plate 24.

The slave cylinder 18 is connected via a line or conduit 26 to a master cylinder 28. The master cylinder 28 is provided with a built-in hydraulic fluid reservoir 29, in the example of structure illustrated, and has an input rod 30 pivotally connectable at an end to a clutch control pedal, not shown, installed within the driver compartment of a motor vehicle, not shown. The rod 30, as is well known, is connected to a piston, not shown. The rod 30, as is well known, is connected to a piston, not shown, disposed in the master cylinder 28 for displacing the hydraulic fluid through the line 26 to the slave cylinder 18 when the clutch pedal is depressed. The line or conduit 26 is a flexible conduit or hose having a connector 32 for connection to the inlet of the slave connector 18, and has another connector 34 on the other end for connection to the outlet of the master cylinder 28.

Although the slave cylinder 18 is, in the illustrated example of structure, of the type having a housing 20 which is formed integral with the clutch bell housing 14, it will be appreciated that the slave cylinder may in the alternative, be formed integral with the transmission or gearbox casing end plate, as disclosed in details in application Ser. No. 537,869, filed Sept. 30, 1983 and assigned to the same assignee as the present application. In such structures, the slave cylinder 18 is already integral or preassembled to the clutch bell housing 14, as illustrated, when the bell housing is bolted to the gearbox casing 15 during assembly of the motor vehicle or, in its alternate configuration, not shown here, the slave cylinder is already preassembled to the transmission or gearbox casing 15 by being made part of the casing end plate. It will be appreciated by those skilled in the art that the invention may be used in combination with any type of concentric slave cylinder as disclosed in detail in the aforesaid co-pending application, Ser. No. 537,869, or with any hydraulic control apparatus for a motor vehicle mechanical clutch, whether utilizing a concentric slave cylinder or a more conventional cylindrical slave cylinder.

The slave cylinder 18, as disclosed in detail in the aforesaid pending application, is adapted to displace a throw-out bearing 36 engaged with the end of the clutch release fingers 38, for releasing the clutch when hydraulic fluid is introduced into the slave cylinder 18 from the master cylinder 28 through the conduit 26. After manufacturing and assembly of the hydraulic apparatus, and prior to filling the apparatus with hydraulic fluid, a restraining strap 40, of the type disclosed in more details in copending application Ser. No. 537,869, for example is installed for holding the throw-out bearing 36 in a retracted position, during shipment of the hydraulic apparatus and installation of the integral subassembly of the slave cylinder 18 and bell housing 14 on a motor vehicle, in the example of structure illustrated. During filling with hydraulic fluid of the hydraulic apparatus, and during shipment and installation of the master cylinder 28 on a motor vehicle, the input rod 30 of the master cylinder is held in an extended position by means such as a clip 42, for example, as disclosed in more detail in U.S. Pat. No. 4,581,979, also assigned to the same assignee as the present application.

In the example of structure illustrated at FIG. 1, the fitting or connector 32, connecting an end of the conduit 26 to the master cylinder 28, is of the leakproof quick-connect type, while the fitting or connector 34 connecting the other end of the conduit 26 to the slave cylinder 18 is of the conventional type. In this manner, after the hydraulic apparatus has been filled with hydraulic fluid, the line or conduit 26 may be broken at the connector 32 without loss of hydraulic fluid or, in the alternative, the master cylinder 28 may be prefilled with hydraulic fluid as a separate first modular unit, while the slave cylinder 18 and the conduit 26 may be filled with hydraulic fluid as a separate second modular unit, the two separate modular units being reconnected after installation of the hydraulic apparatus on a motor vehicle.

In the example of structure of FIG. 2, the leakproof quick-connect connector 32 is used for connecting one end of the line 26 to the slave cylinder 18, while the other end of the conduit 26 connected to the master cylinder 28 is provided with a conventional connector 34. The hydraulic apparatus may thus be broken at the leakproof quick-connect connector 32, after filling and testing of the apparatus or, in the alternative, the separate modular units consisting of the master cylinder 28 with the hose or conduit 26 attached thereto, and of the slave cylinder 18, contained within the bell housing 14, may be separately prefilled and readily connected only after installation of the units on a motor vehicle.

FIG. 3 illustrates a clutch hydraulic control apparatus wherein the conduit 26 is connected to the master cylinder 28 by way of a conventional connector 34 attached to an end of the conduit and the other end of the conduit 26 is connected to the slave cylinder 18 also by way of a conventional connector 34. At some point between the ends of the conduit 26, a leakproof quick-connect connector 32 is disposed such as to permit installing the master cylinder 28 on a motor vehicle with a portion of the conduit 26 attached thereto, and to permit installing the slave cylinder 18 on the motor vehicle already pre-installed in or made integral with the bell housing 14, in the structure illustrated, or pre-installed on, or integral with, the transmission end cover. The hydraulic apparatus may be prefilled with hydraulic fluid and pretested in the manufacturer's plant as a complete assembly or it may be prefilled and pretested in separate modular sub-assemblies, one consisting of the slave cylinder 18 with a portion of the conduit 26 attached thereto, and the other consisting of the master cylinder 28 with the other portion of the conduit 26 attached thereto, and the connection between the ends of the portions of the conduit 26 each provided with one half of the leakproof quick-connect connector 32 is effected during assembly of the motor vehicle.

FIG. 4 illustrates an extreme arrangement for a hydraulic control apparatus having practical applications especially in installations wherein the master cylinder 28 and the slave cylinder 18 are located at a considerable distance from each other, such as for example in a rear-engine motor coach or the like, and the routing of the flexible conduit 26 through the frame or the body of the motor vehicle is more conveniently effected with the ends of the conduit 26 unattached to the master cylinder 28 and to the slave cylinder 18, respectively. The conduit 26 is provided with a leakproof quick-connect connector 32 at each end, and such an arrangement still permits to effectuate a bench filling of the apparatus with hydraulic fluid and testing of the apparatus prior to shipment to the motor vehicle manufacturer. The apparatus is subsequently broken in three separate components or modular units, already filled with hydraulic fluid, one being the master cylinder 28, the other the slave cylinder 18 and the third one the conduit 26. During assembly of the motor vehicle, the three separate components are interconnected without loss of fluid and without introduction of air in the system. Furthermore, if so desirable, the master cylinder 28, the slave cylinder 18 and the conduit 26 may be prefilled and pretested individually.

Figure 6:
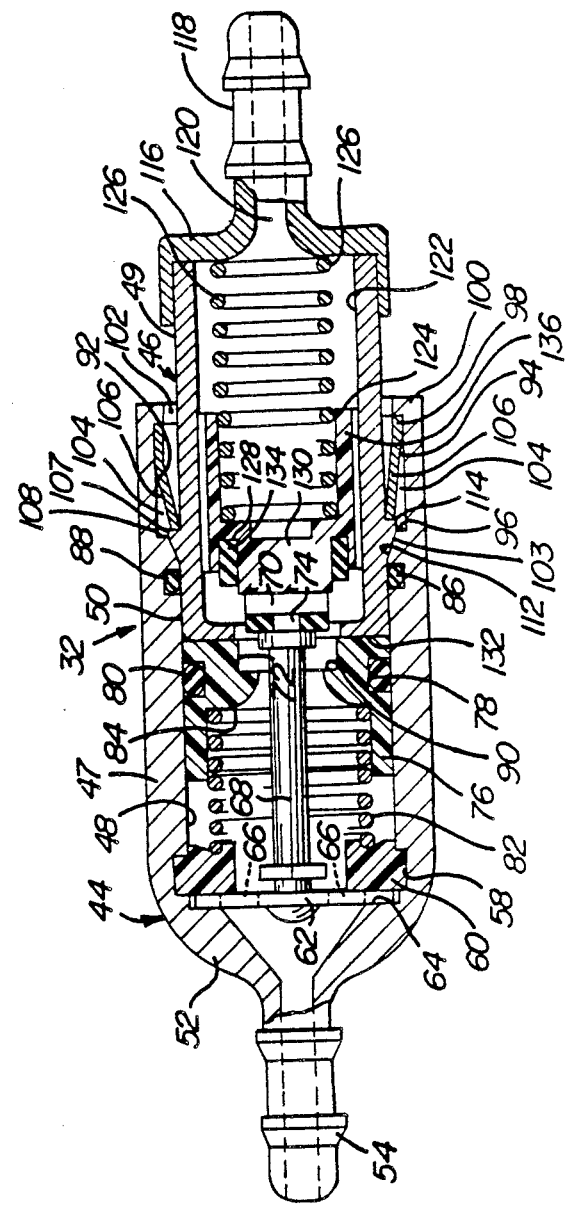
FIG. 6 is a view similar to FIG. 5 and showing the connector halves coupled together, corresponding to a partial section along line 6—6 of FIG. 3.

As illustrated in detail at FIGS. 5 and 7, the leakproof quick-connect connector 32 of FIG. 3 consists of two complementary interchangeable half-connectors or members 44 and 46, each formed of a tubular body 47 and 49, respectively. The half-connector 44 is of the female type and its tubular body 47 has a bore 48 capable of slidably accepting the cylindrical peripheral surface 50 of the tubular body 49 of the half-connector, or connector male member, 46. FIG. 6 illustrates the female and male members 44 and 46 coupled, as also shown at FIG. 3, while FIG. 5 illustrates the female member 44 and the male member 46 uncoupled prior to introducing the tubular body 49 of the male member 46 into the bore 48 of the female member 44, after installation of the master cylinder 28 and of the slave cylinder 18 and clutch bell housing 14 sub-assembly in their respective locations on a motor vehicle.

The tubular body 47 of the female member 44 is formed, for example and preferably, of a single piece casting or forging, of aluminum for example, provided at one end with an integral tapered portion defining an end cap 52 terminating in an integral outwardly projecting fitting 54, a passageway 56 providing fluid communication with the interior of a conduit, such as the conduit 26 (FIG. 3) having its end fitted over the fitting 54 and being adequately clamped thereon. The bore 48 of the tubular body 47 has an enlarged diameter portion 58, at its end provided with the end cap 52, in which is fitted an elastic plastic retainer ring 60 holding a metallic disk 62 against a shoulder 64 at the end of the bore 48. The disk 62 is perforated by a plurality of apertures 66 providing fluid communication between the passageway 56, and therefore the conduit 26 (FIG. 3), and the interior or bore 48 of the tubular body 47. A rod or stem 78 is fixedly mounted at the center of the disk 62 and extends longitudinally and axially in the bore 48. The rod 68 has an enlarged head 70 at its end provided with a groove 72 in which is disposed an annular seal 74 made of elastomeric material.

A sleeve 76 is slidably disposed in the bore 48. The sleeve 76 has a peripheral groove 78 in which is disposed an elastomeric sealing ring 80. A coil spring 82 disposed between the retainer ring 60 and an annular abutment surface 84 of the sleeve 76 urges the sleeve 76 outwardly against or in close proximity with, an elastomeric O-ring 86 disposed in an internal groove 88 close to the open end of the tubular body 47. The sleeve 76 has an end port in the form of a bore 89 that slidably fits about the enlarged head 70 at the end of the rod 68, the bore 89 having a reduced diameter portion forming an annular abutment 90 which, in the uncoupled position of FIG. 5, limits the outward displacement of the sleeve 76 and engages the elastomeric annular seal 74 in the groove 72 of the enlarged head 70 of the rod 68, such that with hydraulic fluid in the bore 48 of the tubular member 47, behind the sleeve 76, the fluid is contained in the bore 48 without leakage to the ambient. The open end of the female member tubular body 47, beyond the O-ring 86, is provided with an enlarged diameter portion 92 in which is disposed resilient means in the form of a retainer clip 94 between the annular shoulder abutments or walls 96 and 98 formed by the enlarged diameter portion 92 of the bore 48, the annular shoulder abutment 98 being defined by the inner surface of an inwardly directed flange 100 ending in a cylindrical surface 102. A frusto-conical surface 103 is disposed between the groove 88 in which is disposed the O-ring 86 and the shoulder abutment or wall 96 of the bore enlarged diameter portion 92.

The retainer clip 94 is made of a relatively thin-walled spring steel tubular member or ring 104 slit as shown at 105, FIG. 7, such that it can be compressed for fitting within the enlarged bore portion 92 at the end of the female member tubular body 47 between the shoulder abutments 96 and 98 and allowed to expand elastically to its original diameter. The spring steel ring 104 has a plurality of inwardly inclined fingers 106 converging towards the interior of the female member bore 48, formed by portions partially cut-out from the body of the ring 104, each finger 106 presenting an end face 107 disposed radially a distance away from the internal surface of the body portion of the spring steel ring 104.

The male half or member 46 of the connector 32 has a tubular body 49 having a peripheral surface 50 of a diameter permitting slidable fit in the bore 48 of the connector female member 44. The periphery 50 of the male member tubular body 49 is provided with an outwardly extending annular ridge or bead 108 of an outer diameter allowing passage of the tip of the ridge 108 within the cylindrical surface 102 of the flange 100 at the tip of the tubular body 47 of the female member 44. The forward side of the ridge 108 defines leading camming means in the form of forms a ramp 112 which, when the male member 46 is introduced into the female member 44, causes together with the nose or tip of the male member, progressive elastic deflection of the retainer clip fingers 106 until the fingers 106 elastically snap back substantially to their original position with the end face 107 of each finger 106 engaging trailing abutment means in the form of a radial annular shoulder 114 formed on the other side of the annular ridqe 108, FIG. 0. Further introduction of the male member 46 into the female member 44 is prevented by the ramp 112 engaging the frusto-conical surface 103 in the female member 44.

The male member tubular body 46 is closed at one extreme end by an end cap 116 screwed on, welded, soldered or brazed in position over that end of the tubular body 49. The end cap 116 is provided with a fitting 118 for connection to an appropriate conduit, a passageway 120 placing the interior of the conduit in fluid communication with the bore 122 within the female member tubular body 48. A cylindrical, generally cup-shaped, valve member 124 is slidably disposed within the bore 122 and is urged by a coil spring 126, having an end abutting the end cap 116 and the other end engaged against an annular abutment 128 within the valve member 124 to the position shown at FIG. 5 when the connector female and male members 44 and 46 are uncoupled. The valve member 124 has a solid cylindrical end portion 130 of a diameter adapted to fit within a retaining end flange 132 formed at the open end of the tubular body 49. An annular elastomeric ring 134 is disposed around the solid cylindrical end portion 130 of the valve member 124 and prevents leakage of fluid from the bore 122 in the male member tubular body 49 to the ambient, when the connector members are uncoupled, in view of the action of the coil spring 126 firmly engaging the elastomeric seal 134 against the inner surface of the end retaining flange 132. The valve member 124 is provided on its periphery with longitudinal grooves 136 which provide fluid communication between the bore 122 of the male member 46 and the bore 48 of the female member 44 when the valve member 124 is displaced, against the biasing action of the coil spring 126, to the position shown at FIG. 6, by the end of the enlarged head portion 70 at the end of the rod 68 in the female member 44, during the coupling of connector female member 44 and male member 46. Simultaneously during coupling, the end of the male member tubular body 49, that is provided with the flange 132, retracts the sleeve 76 in the female member bore 48 against the biasing action of the coil spring 82 such that the sleeve annular abutment 90 no longer engages the annular seal 74 at the enlarged head 70 of the rod 68 and the bore or port B9 is open to hydraulic fluid flow. When coupled together, as shown at FIG. 6, the female member 44 and the male member 46 of the connector 32 thus provide an uninterrupted free passage for the flow of hydraulic fluid between the bore 48 of the female member 44 and the bore 122 of the male member 46, which is leakproof to the ambient as a result of the periphery 50 of the tubular body 48 of the male member 46 being engaged with and compressing the O-ring 86 in the internal groove 88 of the female member 44. After the connector members are securely coupled, FIG. 6, the end face 107 of each flexible finger 106 of the retainer clip 94 engages the annular abutment 114 of the ridge 108 about the periphery of the male member tubular body 49 and separation of the two connector members is prevented.

The structure of FIGS. 5-6 provides a one-way coupling of the connector female member 44 with the male member 46 such as to prevent deliberate breaking off of the hydraulic apparatus once installed in a motor vehicle. If it is desired to disconnect the female member 44 and the male member 46 of the connector 32, a disconnect ring 138, FIGS. 8-9, is all that is required. As shown at FIG. 9, the disconnect ring 138 is a simple metallic or plastic tubular member 140 provided with a slit 142 allowing the tubular member 140 to elastically expand so as to be passed over the periphery of the male member end cap 116, or over the peripherally extending annular ridge 108, in structures where it is desired to provide the male member 46 with a built-in disconnect ring 138, FIG. 8. The disconnect ring 138 is thin enough to enable it to be pushed within the cylindrical surface 102 formed by the flange 100 at the end of the female member tubular body 42. By displacing the disconnect ring 138 to the left, as seen at FIG. 8, the forward edge of ring tubular member 140 causes the fingers 106 of the retainer clip 94 to elastically deflect outwardly, such as to become substantially flush with the remaining of the tubular body 104 of the retainer clip, with the result that the end face 107 of each finger 106 disengages from the abutment shoulder 114 of the male member annular ridge 108. The two connector members 44 and 46 may then be disconnected, with little, if any, loss of hydraulic fluid as both connector members become automatically substantially leakproof, when disconnected, as shown at FIG. 5.

As the disconnect ring 138 offers very little surface at its free end that can be manually grasped for pushing the ring inwardly into the end of the female member tubular body 47, with sufficient force to deflect the fingers 106 of the retainer clip 94, a hand tool 144, as shown at FIG. 10, is provided. The hand tool 144 is in the form of a handle 146 having a bifurcated end 148 which is passed over the tubular body 49 of the male member 46 and used for pushing the disconnect ring 138 within the mouth of the female member tubular body 47, FIG. 8. Connector structures, such as illustrated at FIGS. 5-6, which are not provided with a disconnect ring 138, may nevertheless be disconnected by means of a separate disconnect ring 138 and a hand tool such as the hand tool 144. In order to place the disconnect ring 138 around the periphery of the male member tubular body 49, the ring tubular body 140 is manually expanded and the slit 142 widened such as to pass the disconnect ring 138 over the conduit and over the periphery of the end cap 116. The disconnect ring 138 is thus placed in the position illustrated at FIG. 8, allowing it to be pushed by means of the hand tool 144 for disconnecting the connector members 44 and 46.

FIG. 11 illustrates a modification wherein a disconnect sleeve 148 is provided, which enables the connector female and male members 44 and 46 to be manually disconnected without tools. The disconnect sleeve 148 is preferably molded of relatively resilient plastic. As best shown at FIG. 12, it comprises a pair of concentric tubular members 150 and 152 integrally joined by way of a flange 154 radially projecting as shown at 156, such as to afford a relatively large surface area for effecting a push in the appropriate direction causing the outer edge of the inner tubular member 152 to elastically deflect the fingers 106 of the retainer clip 94 to disconnect the two connector members 44 and 46. In structures where the end cap 116 of the male member is of a larger diameter peripherally than the outer diameter of the tubular member 49, the disconnect sleeve 148 is provided with a slit 158 which enables the disconnect sleeve 148 to expand sufficiently to allow the inner ring 152 to slip over the periphery of the end cap 116, or, alternatively, the disconnect sleeve 148 is installed over the tubular body 49 of the connector male member 46 prior to fitting the end cap 116.

It will be appreciated that in the structure of FIG. 1, one of the members of the quick-connect leakproof connector 32, coupling the conduit 26 to the outlet of the master cylinder 28, preferably the female member, is made integral with the housing of the master cylinder 28, and that in the structure of FIG. 2, one of the members of the connector 32, also preferably the female member, is made integral with the clutch bell housing 14, as illustrated, or is made integral with the transmission end plate, or with the slave cylinder, in structures wherein the slave cylinder is made integral with the transmission casing end plate. In structures as illustrated at FIG. wherein a quick-connect leakproof connector 32 is disposed at each end of the conduit 20, one of the connector members, also preferably the female member, is formed integral with the housing of the master cylinder 28 and the other is made integral with a clutch bell housing or the slave cylinder or, in the alternate structure not shown, with the end plate of the transmission casing.

It will also be appreciated that the quick-connect leakproof connector of the invention has applications in hydraulic apparatus other than motor vehicle clutch control apparatus, such as in hydraulic brake systems, hydraulic engine throttle systems, remote control hydraulic gear shift systems, and the like.

Having thus described the present invention by way of examples of structure thereof, modifications whereof will be apparent to those skilled in the art, what is claimed as new is as follows:

1. A hydraulic apparatus for controlling a utilization device, said apparatus including:
   (A) a master cylinder having an outlet and an input member adapted to be connected to a control member of the utilization device;
   (B) a slave cylinder having an inlet and an output member adapted to be connected to a controlled member of the utilization device;
   (C) a conduit adapted to extend between said master cylinder outlet and said slave cylinder inlet; and
   (D) a quick connect leak-proof connector mounted at a predetermined location between said master cylinder outlet and said slave cylinder inlet to define a first modular unit including said master cylinder and a second modular unit including said slave cylinder, each of said modular units being filled with hydraulic fluid, said quick connector including two engageable members each associated with a respective modular unit, said members acting to hydraulically seal the respective modular units when not engaged and allowing the establishment of hydraulic fluid communication between said modular units when engaged, one of said members comprising a male member having an axially extending body portion and the other of said members comprising a female member defining an axially extending bore sized to receive said body portion of said male member, one of said members including resilient means, the other of said member including leading camming means operative in response to insertion of said male member portion into said female member bore to bias said resilient means resiliently radially, said other member further including trailing abutment means operative in response to movement of said leading camming means past said resilient means to coact with said resilient means to inhibit withdrawal of said male member body portion from said female member bore;

(E) said resilient means comprising a tubular spring clip including a plurality of circumferentially spaced cuts extending from the rear annular edge of the clip to a location proximate to but spaced rearwardly from the front annular edge of the clip to define a plurality of circumferentially arrayed, axially extending finger portions, alternate finger portions being bent radially inwardly from the tubular plane of said clip to define a circumstantial array of spring fingers extending axially rearwardly and radially inwardly to provide free rearward ends movable resiliently radially; and (F) said leading means and said trailing means being defined respectively by the leading and trailing annular surfaces of an annular rib structure on said other member.

2. A hydraulic apparatus according to claim 1 wherein:
(G) said one member is said female member and said other member is said male member; and
(H) said spring fingers are positioned in said axial bore and said annular rib structure comprises an external annular rib on said male member body portion.

3. A hydraulic apparatus according to claim 2 wherein:
(I) said connector further includes a collar mounted slidably on said male member body portion rearwardly of said external annular rib; and
(J) said member when engaged define an annular space therebetween sized to slidably pass said collar so as to allow said collar to be slid forwardly on said male member body portion into said space to bias said spring fingers radially outwardly out of engagement with said abutment surface to allow disengagement of said members.

4. A hydraulic apparatus according to claim 3 wherein:
(K) said collar includes a radially outwardly extending portion spaced rearwardly from the leading edge of said collar to facilitate said movement of said collar into said space and provide a mechanical advantage with respect to the disengaging force applied at the leading edge of said collar.

5. A hydraulic apparatus according to claim 4 wherein:
(L) said collar radially outwardly extending portion comprises an annular radially extending flange.

6. A hydraulic apparatus according to claim 5 wherein:
(M) said flange is proximate the rear edge of said collar.

7. A hydraulic apparatus for controlling the engagement and disengagement of the clutch of a motor vehicle, said apparatus comprising:

(A) a master cylinder having an input rod adapted to be connected to the clutch pedal of the motor vehicle and having an outlet;
(B) an annular slave cylinder assembly adapted to be positioned within the vehicle clutch housing in concentric surrounding relation to the clutch drive shaft interconnecting the vehicle clutch and the vehicle transmission and including an annular housing defining an annular bore and means defining a passage extending between said bore and a slave cylinder assembly inlet;
(C) a conduit adapted to extend between said master cylinder outlet and said slave cylinder assembly inlet;
(D) a quick connect leakproof connector mounted at a predetermined location between said master cylinder outlet and said slave cylinder assembly inlet to define a first modular unit including said master cylinder and a second modular unit including said annular slave cylinder assembly, each of said modular units being filled with hydraulic fluid, said quick connector including two engageable members each associated with a respective modular unit, said members acting to seal the respective modular units when engaged, one of said members comprising a male member having an axially extending body portion and the other of said members comprising a female member defining an axially extending bore sized to receive said body portion of said male member, one of said members including resilient means, the other of said members including leading camming means operative in response to insertion of said male member portion into said female member bore to bias said resilient means resiliently radially, and trailing abutment means operative in response to movement of said leading means past said resilient means to coact with said resilient means to inhibit withdrawal of said male member body portion from said female member bore;
(E) said resilient means comprising a tubular spring clip including a plurality of circumferentially spaced cuts extending from the rear annular edge of the clip to a location proximate to but spaced rearwardly from the front annular edge of the clip to define a plurality of circumferentially arrayed, axially extending finger portions, alternate finger portions being bent radially inwardly from the tubular plane of said clip to define a circumferential array of spring fingers extending axially rearwardly and radially inwardly to provide free rearward ends movable resiliently radially; and
(F) said leading means and said trailing means being defined respectively by the leading and trailing annular surfaces of an annular rib structure on said other member.

8. A hydraulic apparatus according to claim 7 wherein:
(G) said one member is said female member and said other member is said male member; and
(H) said spring fingers are positioned in said axial bore and said annular rib structure comprises an external annular rib on said male member body portion.

9. A hydraulic apparatus according to claim 8 wherein:

(I) said connector further includes a collar mounted slidably on said male member body portion rearwardly of said external annular rib; and (J) said member when engaged define an annular space therebetween sized to slidably pass said collar so as to allow said collar to be slid forwardly on said male member body portion into said space to bias said spring fingers radially outwardly out of engagement with said abutment surface to allow disengagement of said members.

10. A hydraulic apparatus according to claim 9 wherein:

(K) said collar includes a radially outwardly extending portion spaced rearwardly from the leading edge of said collar to facilitate said movement of said collar into said space and provide a mechanical advantage with respect to the disengaging force applied to the leading edge of said collar.

11. A hydraulic apparatus according to claim 10 wherein:

(L) said collar radially outwardly extending portion comprises an annular radially extending flange.

12. A hydraulic apparatus according to claim 11 wherein:

(M) said flange is proximate the rear edge of said collar.

13. A hydraulic apparatus for installation in a vehicle or machine, said apparatus when installed comprising a hydraulic master cylinder, a remote hydraulic slave cylinder, and a conduit connecting the master cylinder to the slave cylinder, characterized in that the master cylinder, slave cylinder and conduit are filled with hydraulic fluid and in that a connector is provided through which hydraulic fluid can pass, said connector being of a leakproof quick connect type and comprising a pair of connector members each including valve arrangements which valve arrangements are both closed when the connector members are not coupled to enable the cylinders to be interconnected through the conduit, said connector members including coacting means engaging in response to coupling of said members to inhibit disconnect of said members, said connector further comprising a disconnect member mounted on one of said connector members and operative in response to movement of said disconnect member with said connector members coupled to disengage said coacting means and allow disconnect of said connector members, said coacting means including a tubular spring clip including a plurality of circumferentially spaced cuts extending from one annular edge of the clip to a location proximate to but spaced from the other annular edge of the clip to define a plurality of circumferentially arrayed axially extending finger portions, alternate finger portions being bent radially inwardly from the tubular plane of said clip to define a circumferential array of spring fingers extending axially and radially inwardly to provide free ends movable resiliently radially.

14. A hydraulic apparatus according to claim 13 wherein said disconnect member comprises a collar mounted concentrically and slidably on said one connector member.

15. A hydraulic apparatus according to claim 14 wherein said coacting means includes spring means and said collar moves said spring means to a disengaged position in response to sliding movement of said collar on said one connector member.

* * * * *

UNITED STATES PATENT AND TRADEMARK OFFICE
CERTIFICATE OF CORRECTION

Page 1 of 2

PATENT NO. : 4,991,627
DATED : February 12, 1991
INVENTOR(S) : Richard A. Nix

It is certified that error appears in the above-identified patent and that said Letters Patent is hereby corrected as shown below:

Column 2, Line 7, Please delete "it" and insert -- its --.

Column 2, Line 11, Please delete "mad" and insert -- made --.

Column 2, Line 29, Please delete "enumerate" and insert -- enumerated --.

Column 3, Line 55, Please delete "nodes" and insert -- modes --.

Column 3, Line 66, After "FIG" insert -- 1 --.

Column 4, Line 26, After "clutch assembly" insert -- 11 --.

Column 4, Line 34, After "driveshaft" insert -- 13 --.

Column 4, Line 40, After "input shaft" insert -- 13, --.

Column 5, Line 17, After "clutch" (2nd occurrence) insert -- 11 --.

Column 8, Line 5, After "form of" delete "forms".

Column 8, Line 14, Please delete "FIG.O" and insert -- FIG.6 --.

Column 8, Line 57, Please delete "B9" and insert -- 89 --.

Column 10 Line 3, After "member" insert -- 46 --.

Column 10, Line 24, After "FIG." insert -- 4, --.

UNITED STATES PATENT AND TRADEMARK OFFICE
CERTIFICATE OF CORRECTION

PATENT NO. : 4,991,627
DATED : Feb. 12, 1991
INVENTOR(S) : Richard A. Nix

It is certified that error appears in the above-identified patent and that said Letters Patent is hereby corrected as shown below:

Column 10, Line 25, Please delete "20" and insert -- 26 --.

Column 11, Line 2, Please delete "member" and insert -- members --

Column 11, Line 21, Please delete "circumstantial" and insert -- circumferential --.

Column 11, Line 42, Please delete "member" and insert -- members --.

Column 13, Line 4, Please delete "member" and insert -- members --.

Column 14, Line 4, After "coupled" insert -- and are both opened when the connector members are coupled --.

Signed and Sealed this

Nineteenth Day of October, 1993

Attest:

BRUCE LEHMAN

*Attesting Officer*      Commissioner of Patents and Trademarks